United States Patent
Durand

(10) Patent No.: US 7,044,535 B2
(45) Date of Patent: May 16, 2006

(54) STRUCTURAL COMPOSITE BODY CLOSURE PANELS FOR USE WITH A VEHICULAR SPACE FRAME ASSEMBLY

(75) Inventor: Robert D. Durand, Lancaster, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/619,379

(22) Filed: Jul. 14, 2003

(65) Prior Publication Data

US 2004/0104601 A1    Jun. 3, 2004

Related U.S. Application Data

(60) Provisional application No. 60/396,365, filed on Jul. 16, 2002.

(51) Int. Cl.
    *B60J 7/00*    (2006.01)
(52) U.S. Cl. .................................. 296/203.01; 296/205
(58) Field of Classification Search ........... 296/203.01, 296/205, 181.2, 901, 29, 209, 204, 224, 30, 296/165, 193.01, 203.03; 49/495.1; 52/731.6, 52/202, 208, 653.2; 280/785; 114/298, 114/301, 303, 304, 306, 307, 309; D12/215
    See application file for complete search history.

(56) References Cited

U.S. PATENT DOCUMENTS

| | | | | | |
|---|---|---|---|---|---|
| 1,581,931 | A | * | 4/1926 | Lamplugh | .................... 296/205 |
| 1,674,425 | A | * | 6/1928 | Claveau | .................. 296/203.01 |
| 3,292,969 | A | * | 12/1966 | Eggert, Jr. | ................... 296/205 |
| 4,045,075 | A | * | 8/1977 | Pulver | ......................... 296/205 |
| 4,049,309 | A | * | 9/1977 | Seal | ......................... 296/181.5 |
| 4,158,397 | A | * | 6/1979 | Reynolds | ..................... 180/210 |
| 4,660,345 | A | * | 4/1987 | Browning | .................... 296/205 |
| 5,028,071 | A | * | 7/1991 | Bolam | ......................... 296/205 |
| 5,094,313 | A | * | 3/1992 | Mauws | ....................... 296/205 |
| 5,129,700 | A | * | 7/1992 | Trevisan et al. | ........ 296/193.07 |
| 5,213,386 | A | | 5/1993 | Janotik et al. | |
| 5,271,687 | A | * | 12/1993 | Holka et al. | ........... 296/203.01 |
| 5,338,080 | A | | 8/1994 | Janotik et al. | |
| 5,458,393 | A | | 10/1995 | Benedyk | |
| 5,720,511 | A | | 2/1998 | Benedyk | |
| 5,839,777 | A | | 11/1998 | Vlahovic | |

(Continued)

FOREIGN PATENT DOCUMENTS

DE    3720344    *    1/1989

(Continued)

*Primary Examiner*—Kiran B. Patel
(74) *Attorney, Agent, or Firm*—MacMillan, Sobanski & Todd, LLC

(57) ABSTRACT

A vehicular space frame assembly includes a plurality of structural components that are secured together to define an enclosed three-dimensional space. A plurality of body closure panels, such as a pair of door closure panels, a front windshield closure panel, a rear windshield closure panel, and a floor pan closure panel, are mounted on the structural components. Each of the body closure panels is a generally flat panel having one or more open spaces provided therein to support other components of the vehicular body on the space frame assembly. The body closure panels may have respective recesses formed therein that receive portions of the associated structural components therein. The recesses may be sized and shaped to receive the receive these portions in a snap fit relationship. One or more gaskets or other conventional sealing devices may be disposed between each of the body closure panels and the associated structural components of the vehicular space frame assembly. Additionally, other gaskets may be provided on the body closure panels to provide a sealed engagement with the other components of the vehicular body and frame assembly.

6 Claims, 1 Drawing Sheet

U.S. PATENT DOCUMENTS

| | | | | |
|---|---|---|---|---|
| 5,848,853 | A | * | 12/1998 | Clenet .................. 296/205 |
| 5,954,364 | A | * | 9/1999 | Nechushtan ........... 296/203.01 |
| 6,010,182 | A | * | 1/2000 | Townsend .............. 296/203.01 |
| 6,022,070 | A | * | 2/2000 | Ashina et al. ............... 296/205 |
| 6,073,399 | A | * | 6/2000 | Shipman et al. ............. 52/36.1 |
| 6,282,790 | B1 | * | 9/2001 | Jaekel et al. ................. 296/205 |
| 6,299,244 | B1 | * | 10/2001 | Tarahomi .................... 296/210 |

FOREIGN PATENT DOCUMENTS

| | | | |
|---|---|---|---|
| DE | 4447213 | * | 7/1996 |
| EP | 0 076 934 | | 4/1983 |
| EP | 0 240 470 | | 10/1987 |
| EP | 622289 | * | 4/1994 |
| WO | WO 01/81155 | | 11/2001 |

* cited by examiner

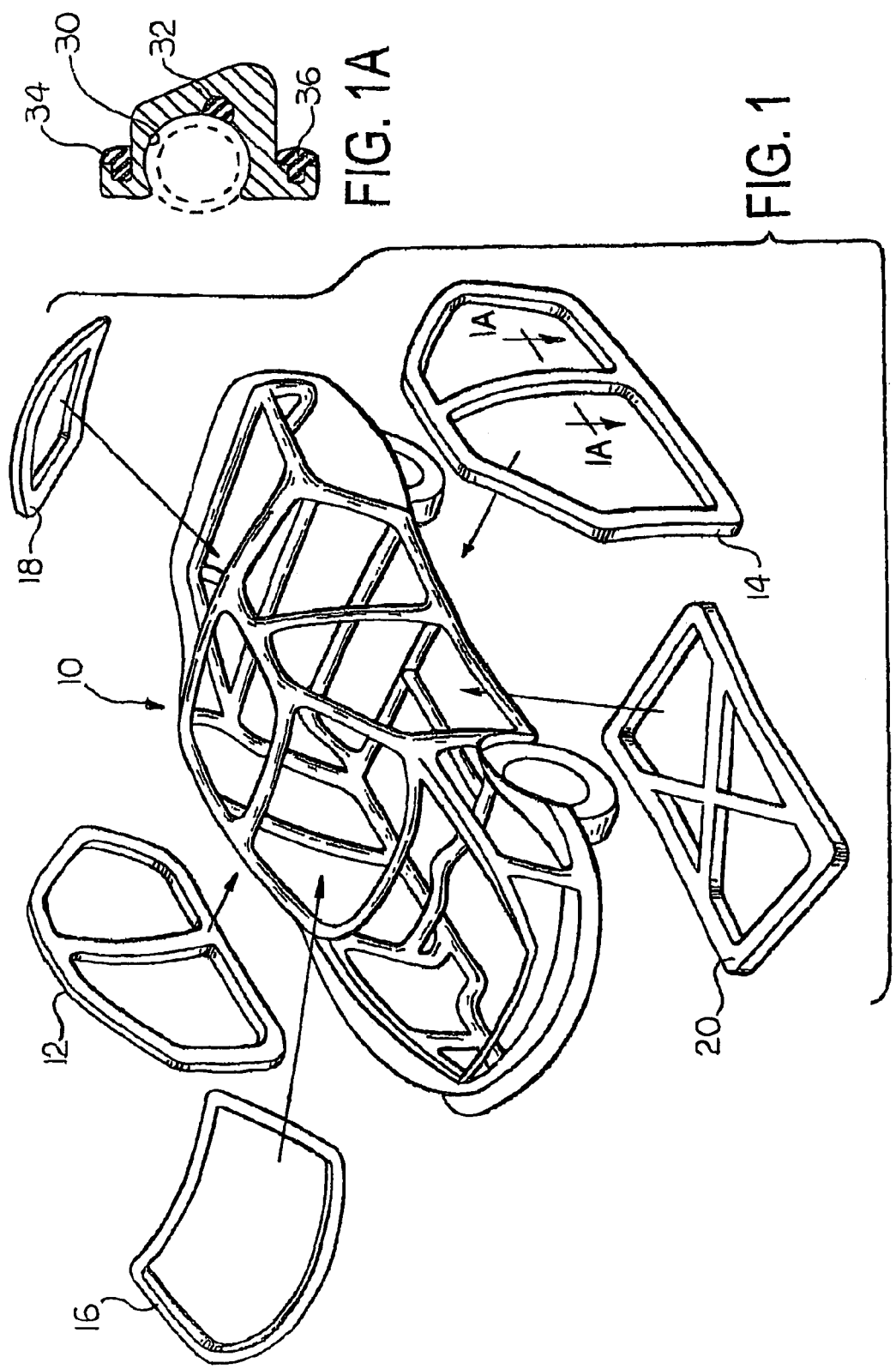

STRUCTURAL COMPOSITE BODY CLOSURE PANELS FOR USE WITH A VEHICULAR SPACE FRAME ASSEMBLY

CROSS REFERENCE TO RELATED APPLICATION

This application claims the benefit of U.S. Provisional Application No. 60/396,365, filed Jul. 16, 2002, the disclosure of which is incorporated herein by reference.

BACKGROUND OF THE INVENTION

This invention relates in general to body and frame assemblies for vehicles. More specifically, this invention relates to an improved structure for a vehicular space frame assembly having a plurality of closure panels secured thereto.

Many land vehicles in common use, such as automobiles, vans, and trucks, include a body and frame assembly that is supported upon a plurality of ground-engaging wheels by a resilient suspension system. The structures of known vehicular body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

One particular type of unitized frame assembly is known as a space frame assembly. A space frame assembly can be defined as a vehicle frame assembly having a plurality of structural components that are secured together in such a manner as to define an enclosed three-dimensional space, such as for the occupants of the vehicle. For example, a space frame assembly may be used to form a unitized frame assembly for a passenger car or for a cab for a truck. In each instance, the structural components of the space frame assembly are secured together to form the enclosed three dimensional space. To accomplish this, the various structural components may be formed having differing shapes as desired.

Traditionally, a plurality of body components are secured to a vehicular space frame assembly. The various body components are provided to facilitate the securement of other structures thereon, such as the doors, the front and rear windshields, the floor pan, and the like. The securement of such body components has, in the past, been accomplished using traditional securement methods, such as welding, threaded fasteners, and the like. Although effective, it has been found that the securement of such body components in this manner is relatively time consuming and expensive. Furthermore, the replacement of such body components has also been found to be relatively time consuming and difficult when secured to the vehicular space frame assembly in this manner. Thus, it would be desirable to provide an improved structure for a vehicular space frame assembly that avoids these problems.

SUMMARY OF THE INVENTION

This invention relates to an improved structure for a vehicular space frame assembly having a plurality of body closure panels secured thereto. The vehicular space frame assembly is formed from a plurality of structural components that are secured together in such a manner as to define an enclosed three-dimensional space, such as for the occupants of the vehicle. A plurality of body closure panels, such as a pair of door closure panels, a front windshield closure panel, a rear windshield closure panel, and a floor pan closure panel, are adapted to be mounted on the structural components of the vehicle frame assembly. Each of the body closure panels is a generally flat panel having one or more open spaces provided therein to support other components of the vehicular body on the space frame assembly. A portion of each of the body closure panels may have a recess formed therein that receives a portion of the associated structural component of the vehicular space frame assembly therein. The recesses may be sized and shaped in accordance with the size and shape of the outer surface of the associated structural components. If desired, the recess formed in the door closure panel may be sized and shaped to receive the receive the portion of the associated structural component of the vehicular space frame assembly therein in a snap fit relationship. One or more gaskets or other conventional sealing devices may be disposed between each of the body closure panels and the associated structural components of the vehicular space frame assembly. Additionally, other gaskets may be provided on the body closure panels to provide a sealed engagement with the other components of the vehicular body and frame assembly.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is an exploded perspective view of a vehicular space frame assembly including a plurality of body closure panels that are adapted to be secured thereto in accordance with this invention.

FIG. 1A is an enlarged sectional elevational view taken along line 1A—1A of FIG. 1 showing a joint between one of the structural components of the vehicular space frame assembly and one of the body closure panels after being assembled together.

DETAILED DESCRIPTION OF THE PREFERRED EMBODIMENT

Referring to the drawings there is illustrated in FIG. 1 a space frame assembly, indicated generally at 10, for a vehicle in accordance with this invention. The illustrated space frame assembly 10 is formed from a plurality of structural components that are secured together in such a manner as to define an enclosed three-dimensional space, such as for the occupants of the vehicle. All of the structural components in the illustrated vehicular space frame assembly 10 are closed channel structural members (i.e., structural members that have a continuous cross sectional shape, such as tubular or box-shaped), although such is not required. As is typical for vehicular space frame assemblies of this general type, the body portion and the frame portion are combined into an integral unit that can be resiliently supported upon the vehicle wheels (not shown) by a suspension system (not shown. Although this invention will be described and illustrated in the context of the illustrated vehicular space frame assembly for a passenger car, it will be appreciated that this invention may be practiced using any type of space frame assembly for any type of vehicle.

A plurality of body closure panels are adapted to be mounted on the structural components of the vehicle frame assembly 10. For example, such body closure panels can include a pair of door closure panels 12 and 14, a front windshield closure panel 16, a rear windshield closure panel 18, and a floor pan closure panel 20. Each of the closure panels. Each of the body closure panels 12, 14, 16, 18, and 20 is a generally flat panel having one or more open spaces provided therein. The open spaces are provided to support other components of the vehicular body on the space frame assembly 10. For example, the open spaces of the door closure panels 12 and 14 are provided to allow vehicular doors (not shown) to be pivotably supported thereon. The open spaces of the front windshield closure panel 16 and the rear windshield closure panel 18 are provided to allow respective windshields (not shown) to be mounted thereon. Lastly, the open spaces of the floor pan closure panel 20 are provided to allow a floor pan (not shown) or other components to be secured thereto.

The body closure panels 12, 14, 16, 18, and 20 can be formed from any desired material or group of materials. For example, the body closure panels 12, 14, 16, 18, and 20 can be formed from composite, plastic, and metallic materials, or any combination of same. The outwardly facing surfaces of the body closure panels 12, 14, 16, 18, and 20 can be formed having a high quality finish, commonly referred to as a Class A finish in the field of vehicle manufacture.

FIG. 1A shows in detail a joint between one of the structural components of the vehicular space frame assembly 10 and one of the door closure panels 14 after being assembled together. As shown therein, a portion of the door closure panel 14 has a recess 30 formed therein that receives a portion of the associated structural component of the vehicular space frame assembly 10 therein. Preferably, the recess 30 formed in the door closure panel 14 is sized and shaped in accordance with the size and shape of the outer surface of the associated structural component of the vehicular space frame assembly 10, although such is not required. If desired, one or more gaskets or other conventional sealing devices may be disposed between the door closure panel 14 and the associated structural component of the vehicular space frame assembly 10. In the illustrated embodiment, a first gasket 32 is disposed within the cavity 30 between the door closure panel 14 and the associated structural component of the vehicular space frame assembly 10. Additionally, second and third gaskets 34 and 36 may be provided on the opposed outer surfaces of the door closure panel 14 to provide a sealed engagement with the vehicular doors that are adapted to be pivotably supported thereon. Similar gaskets (not shown) may be provided elsewhere on any of the body closure panels 12, 14, 16, 18, and 20 to provide a sealed engagement with other components of the vehicular body and frame assembly.

The body closure panels 12, 14, 16, 18, and 20 can be secured to the structural components of the vehicular space frame assembly 10 in any desired manner. For example, the recess 30 formed in the door closure panel 14 may be sized and shaped to receive the receive the portion of the associated structural component of the vehicular space frame assembly 10 therein in a snap fit relationship. When secured to the vehicular space frame assembly 10 in this manner, the body closure panels 12, 14, 16, 18, and 20 can be quickly and easily removed therefrom if desired. For example, it may be desirable to remove one or more of the body closure panels 12, 14, 16, 18, and 20 for repair or replacement. Also, the ability to remove the body closure panels 12, 14, 16, 18, and 20 can facilitate recycling of the materials used therein when the vehicle is removed from service. Alternatively, the body closure panels 12, 14, 16, 18, and 20 can be secured to the structural components of the vehicular space frame assembly 10 by welding, adhesives, threaded fasteners, or any other conventional securement mechanism.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicular body and frame assembly comprising:
   a plurality of structural components that are secured together in such a manner as to form a space frame assembly defining an enclosed three-dimensional space for receiving occupants of a vehicle; and
   a plurality of body closure panels mounted on said structural components of said space frame assembly to form the vehicular body and frame assembly, each of said plurality of body closure panels having a recess formed therein that receives a portion of an associated one of said plurality of structural components to mount said plurality of body closure panels on said structural components of said vehicle frame assembly;
   a first sealing device disposed between each of said body closure panels and said plurality of structural components; and
   a second sealing device provided on each of said body closure panels, said second sealing devices adapted to provide a sealed engagement with other components of the vehicular body and frame assembly.

2. The vehicular body and frame assembly defined in claim 1 wherein each of said body closure panels is a generally flat panel having one or more open spaces provided therein to support other components of the vehicular body and frame assembly thereon.

3. The vehicular body and frame assembly defined in claim 1 wherein said plurality of body closure panels includes at least one of a door closure panel, a front windshield closure panel, a rear windshield closure panel, and a floor pan closure panel.

4. The vehicular body and frame assembly defined in claim 1 wherein said plurality of body closure panels includes each of a door closure panel, a front windshield closure panel, a rear windshield closure panel, and a floor pan closure panel.

5. The vehicular body and frame assembly defined in claim 1 wherein each of said recesses is sized and shaped in accordance with a size and shape of said associated ones of said plurality of structural components.

6. The vehicular body and frame assembly defined in claim 1 wherein each of said recesses is sized and shaped to receive said associated ones of said plurality of structural components in a snap fit relationship.

* * * * *